Nov. 13, 1934.   W. G. DOYLE   1,980,790
OPERATING MECHANISM FOR CLUTCHES
Filed Dec. 8, 1932
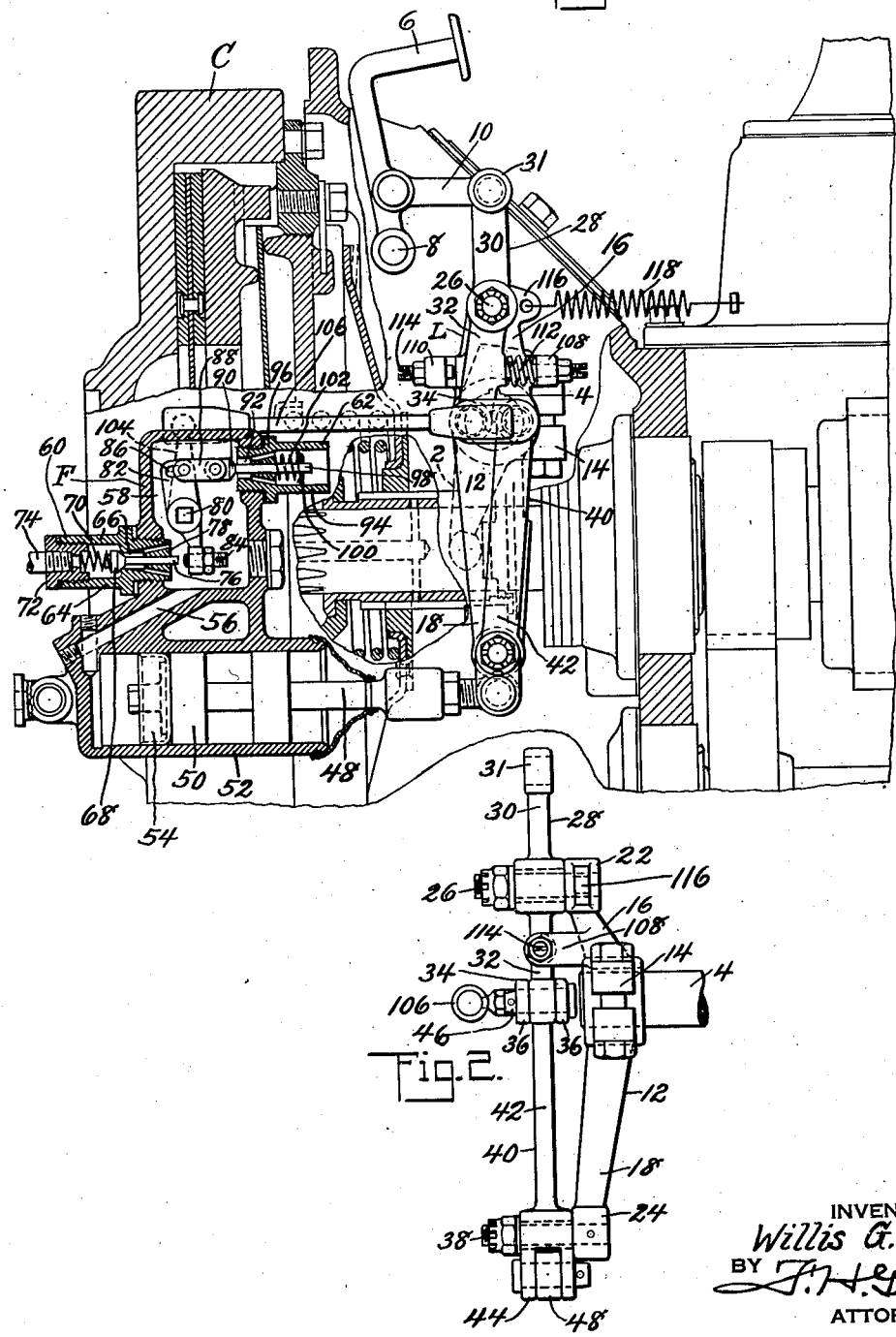
INVENTOR-
Willis G. Doyle
BY
ATTORNEY- Patented Nov. 13, 1934

1,980,790

UNITED STATES PATENT OFFICE

1,980,790

OPERATING MECHANISM FOR CLUTCHES

Willis G. Doyle, Detroit, Mich., assignor to American Car and Foundry Motors Company, New York, N. Y., a corporation of Delaware Application December 8, 1932, Serial No. 646,221

9 Claims. (Cl. 192—91)

This invention relates to power actuating mechanism for controlling the operation of certain parts of a motor vehicle, and while the invention is shown for operating the clutch of a motor vehicle the invention is not specifically limited to such use for it may be easily adapted for the operation of brakes and other mechanism.

In the operation of large motor vehicles such as trucks, buses, etc., the operation of a clutch is laborious and it is one object of the present invention to provide a means which will render the effort of operating a clutch so small that the clutch may be held open for a considerable time without tiring the driver.

Another object of this invention is the provision of an air-operated means for actuating a clutch which is so designed that it will not interfere with the normal operation of the clutch.

Still another object of this invention is to provide fluid pressure operating means for operating a clutch whereby to relieve the driver of the necessity of using the large amount of force ordinarily required for operating the clutch of a heavy motor vehicle.

A further object of this invention is the provision of an air-operated clutch control device operable to regulate the air pressure automatically in accordance with the pressure exerted upon the usual clutch pedal by the driver of the vehicle.

A still further object of the present invention is the provision of an air-operated clutch control device which is easy and inexpensive to manufacture and strong and durable in operation.

Other objects and advantages of this invention will be apparent from the following description taken in conjunction with the accompanying drawing in which:

Figure 1 is a sectional view through a part of a motor vehicle showing a clutch, in section, and showing a transmission, the view having the present invention associated with the clutch and certain parts of said invention being shown in section, and Fig. 2 is a front elevation of the lever assembly forming a part of the present invention.

Referring now more particularly to the drawing, C indicates a disc clutch and fly-wheel of conventional design which is operated by means of a crank 2 fixed to a clutch throw-out shaft 4 supported in any suitable or desired manner. For actuating the shaft 4 a lever assembly indicated generally at L is provided which is operated by means of a foot pedal 6 connected with said lever assembly and by fluid pressure means controlled by said lever assembly as will be presently pointed out in detail. As clearly shown in Fig. 1, the foot pedal 6 is fulcrumed at 8 and is provided with an arm 10 connected with the lever assembly.

The lever assembly L is carried by the shaft 4 and comprises a clutch throw-out lever indicated generally at 12 fixed to the shaft 4 as shown at 14 and formed of upper and lower lever arms 16 and 18 respectively, the free ends of which arms terminate in bosses 22 and 24.

Supported for pivotal movement on a pin 26 carried in boss 22 is a pressure regulation lever indicated generally at 28 comprising upper and lower arms 30 and 32 respectively, the former being provided with a bearing 31 to which the arm 10 of foot pedal 6 is connected, as shown clearly in Fig. 1. The lever 28 is pivoted intermediate its ends and its lower arm 32 is deflected from the general direction of arm 30 (see Fig. 1) and its lower end portion is pivotally connected to a lever link indicated generally in Fig. 2 at 34 adjacent one end thereof. In the instance shown, the link 34 comprises spaced elements 36 between which the lower end of the arm 32 of lever 28 is arranged. Supported in boss 24 is a fulcrum pin 38 which pivotally supports a pressure application lever indicated generally at 40. Said lever 40 is pivoted adjacent its lower end to provide a relatively long upper lever arm 42 and a comparatively short lever arm 44, the arm 42 having its upper end portion arranged between the elements 36 of link 34 adjacent the opposite end portion of said link and is pivoted to said link by means of a pin 46. The short lever arm 44, as clearly shown in Fig. 2, is bifurcated and is pivotally connected to the end of a piston rod 48. The piston rod carries a piston 50 arranged in a cylinder 52 forming a part of an integral casting constituting a fluid pressure lever operating device indicated generally at F. The piston 50 carries a flexible cup-shaped washer 54 at its forward end for sealing purposes and the cylinder 52 is connected through a port 56 with an air chamber 58 provided with air intake and exhaust means 60 and 62 respectively.

The air intake means 60 comprises a tubular housing 64 threadedly secured to the air chamber 58 and provided with an air intake passage 66 which is normally closed by a valve 68 urged to seated position by a compression spring 70 interposed between the valve and a housing closure 72. The closure 72 is connected to an air pipe 74 which leads from a suitable source of supply of air under pressure. The valve 68 is provided with a stem 76 which has a bearing in a spider 78 formed in the air passage 66 of the housing 64 and the valve stem projects beyond said spider 78 when the valve 68 is in seated position, as clearly shown in Fig. 1.

Mounted within the air chamber 58 is a rock shaft 80 which carries a crank 82 the lower end of which is provided with a valve operating set screw 84 adapted to engage the valve stem 76 when the crank 82 is turned in one direction whereby to unseat the valve 68. The screw 84 is adjustable within the crank and may be secured in adjusted position by a nut or other suitable means. The crank 82 has its upper end portion slotted as shown at 86 to pivotally support a link 88 the opposite end of which is connected to a valve 90 arranged within the air chamber 58 and adapted to close the air passage 92 of the air exhaust means 62, the latter comprising a fitting 94 open to the atmosphere and having a bearing member or spider 96 therewithin in which the valve stem 98 of valve 90 is arranged. The valve stem is provided with a spring seat 100 and between said spring seat and the bearing 96 a compression spring 102 is arranged which functions normally to hold the valve 90 in seated position relative to the air passage 92.

The shaft 80 has one end thereof extended outside the air chamber 58 and a crank 104 is carried by the shaft 80 and said crank is adapted to be operated by means of a connector 106 extended between said crank and the lever link 34.

As clearly shown in the drawing, the arm 32 of lever 28 is arranged between stop elements 108 and 110 respectively formed on arms 16 of lever 12. Interposed between the stop 108 and the arm 32 of lever 28 is a compression spring 112 adapted to maintain levers 12 and 28 in a predetermined relative position. Action of spring 112 in maintaining the levers 12 and 28 in their normal position as shown in Fig. 1 when the pedal 6 is not depressed also causes the connector 106 to maintain valve 90 in open position and valve 68 in closed position. The stop member 110 is provided with a set screw 114 which may be adjusted to obtain desired movement of the lever 28 relative to the lever 12.

Formed with lever 12 is a lug 116 to which a tension spring 118 is connected, the latter extending to a fixed portion of the vehicle and being adapted to retain the crank 2 out of contact with the clutch when latter is fully engaged. In the instance shown, the spring 118 is shown as being connected to the housing for the gear shift but this is merely by way of example and actually, in practice, the spring 118 would be connected below the floor parts of the vehicle and to a fixed part of the vehicle.

The drawing shows the device in its normal position. In use, when the foot pedal 6 is depressed by a driver the tendency is for the lever assembly L to rotate shaft 4. This movement will occur until the resistance of the usual clutch spring is encountered whereupon further depression of the pedal 6 causes the lever 28 to shift on its pivot 26 relative to the lever 12, thus shifting the link 34 to the right as viewed in Fig. 1 and actuating the connector 106 which will cause rotation of the shaft 80 and crank 82. Operation of the crank 82 permits the spring 102 to effect closing of the air exhaust passage 92 by the valve 90 and then actuation of the valve 68 by the set screw 84 to permit air under pressure to enter the fluid receiving chamber 58. It is to be noted that the parts are preferably so proportioned that the valve 90 closes the passage 92 prior to entrance of air under pressure into the chamber 58. The shifting of the link 34 as above mentioned causes the lever 40 to shift on its pivot 38 and forces the piston 50 inwardly in cylinder 52, that is to the left of the full line position shown in Fig. 1. The air under pressure passes from the chamber 58 through the passage 56 into the cylinder 52 where it acts against the piston 50 moving the same in the cylinder 52 and shifting the entire lever assembly L by acting against the short arm 44 of the lever 40, thus actuating the clutch throw-out shaft 4 to cause the crank 2 to disengage the clutch. During this operation the driver is holding the foot pedal 6 depressed but the force required to do this is only that necessary to resist the reaction of the lever 40 as the result of this air pressure acting against the piston 50. Actually, the driver must use sufficient force to retain the link 34 in its shifted position and consequently the lever 6 must be actuated corresponding to the operation of the piston 50 and the lever 40 so that the connector 106 will maintain the shaft 80 in rocked position in order that the valve 68 may be held open and the valve 90 retained in closed position to permit entrance of air into the chamber 58 for the purpose of operating the piston 50. It will be apparent that the force required to hold the pedal 6 depressed is much less than that required to mechanically operate a clutch. The admission of fluid under pressure is obviously controlled by the extent of movement of the valve 68 and this, of course, is dependent upon the movement of the pedal 6 and the lever 28 and link 34.

As can be seen in Fig. 1, operation of the connector 106 first causes seating of the valve 90 and then actuation of the valve 68 to open position. When pressure has been built up in cylinder 52 and chamber 58 sufficient to move the piston 50 a distance sufficient to operate the lever assembly L, the connector 106 is free to move to the left as viewed in Fig. 1, which will cause the shaft 80 to shift whereby, due to slot 86, the valve 90 is maintained in closed position and the valve 68 moves to closed position. This is what may be termed "a holding stage" in which both the valves 68 and 90 are closed and the lever assembly L retained in shifted position and the clutch elements disengaged. When the clutch pedal 6 is permitted to raise, thus engaging the clutch elements, link 106 moves to its normal position, thus closing the intake valve 68 and opening valve 90 and permitting escape of air from the chamber 58 to the atmosphere and the return of the lever assembly L to its normal position.

It will be apparent from the above description that the force required of the driver is small compared to that incident to the operation of strictly mechanical clutches, it being only necessary to exert sufficient force to cause actuation of the connector 106 to close valve 90 and open the valve 68.

In the event of failure of the fluid pressure system it is apparent that the clutch may be operated mechanically by the foot pedal 6 due to the cooperative relation between the lever arm 32 and the stop 110 or its associated set screw 114; operation of the lever assembly until the arm 32 of lever 28 contacts with the set screw 114 and continuation of pedal movement will obviously actuate the entire lever assembly L and shift the clutch throw-out lever 4.

The drawing herein illustrates one embodiment of the invention but it is to be understood that they are for illustrative purposes only and various changes in the form and proportions of the device may be made within the scope of the appended claims without departing from the spirit of the invention.

What is claimed is:

1. In a motor vehicle, in combination with a clutch, operating mechanism for the clutch comprising a lever assembly, a foot pedal, a pressure regulation lever forming a part of said lever assembly connected with the foot pedal and adapted to shift said assembly, fluid pressure means, a pressure application lever forming a part of said lever assembly connected with said fluid pressure means and adapted to be operated by the latter to shift said lever assembly, a link connecting said levers, and means connected to said link and actuated by movement of said pressure regulation lever for controlling the operation of said fluid pressure means.

2. In a motor vehicle, in combination with a clutch, clutch operating means comprising a clutch throw-out lever, a foot pedal, a pressure regulation lever pivotally connected with the clutch throw-out lever and shiftable by said pedal, means on the clutch throw-out lever for limiting pivotal movement of the pressure regulation lever relative to the clutch throw-out lever whereby the latter may be actuated by said pressure regulation lever, a pressure application lever pivoted to said clutch throw-out lever and connected with the pressure regulation lever, fluid pressure means with which said pressure application lever is connected, and means operated by said pressure regulation lever during pivotal movement thereof relative to the clutch throw-out lever for controlling the operation of the fluid pressure means.

3. In a motor vehicle, in combination with a clutch, clutch operating mechanism comprising a clutch throw-out lever, a pressure regulation lever pivoted to the clutch throw-out lever, a pressure application lever pivoted to the clutch throw-out lever and connected with the pressure regulation lever, means for limiting pivotal movement of the pressure regulation lever relative to the clutch throw-out lever, a foot pedal connected to the pressure regulation lever and adapted to pivotally shift the latter and to actuate the clutch throw-out lever, fluid pressure means connected with the pressure application lever and operative to shift said clutch throw-out lever, air inlet and exhaust means for the fluid pressure means, and means operative by and during pivotal movement of the pressure regulation lever for controlling the air inlet and exhaust means.

4. In a motor vehicle, in combination with a clutch, clutch operating mechanism comprising a clutch throw-out lever, a pair of levers pivotally connected to said clutch throw-out lever, a foot pedal connected to one of the pair of levers, fluid pressure means connected to the other of said pair of levers, means connecting said pair of levers, a valve for controlling the fluid pressure means, and a valve operator connected with the lever connecting means and operable upon pivotal movement of said pair of levers.

5. In a motor vehicle, in combination with a clutch, clutch operating mechanism comprising a clutch throw-out lever rotatably supported intermediate its ends, a pressure regulation lever pivoted to one end and a pressure application lever pivoted to the other end thereof, means pivotally connecting an end of each of said regulation and application levers, a clutch pedal connected with said regulation lever, fluid pressure means connected with said application lever, and means connected with said connecting means effective upon movement of said regulation lever to operate said fluid pressure means.

6. In clutch operating mechanism, a pressure regulation lever, a pressure application lever, means pivotally connecting an end of each thereof, a clutch throw-out lever to which each of said levers is pivoted, a foot pedal connected to said regulation lever, fluid pressure means connected to said application lever, and means connected with said connecting means for controlling the operation of said pressure means.

7. In clutch operating mechanism, a rotatable clutch throw-out shaft, a lever assembly carried by said shaft comprising a clutch throw-out lever, a pair of connected levers pivotally supported by and movable relative to said throw-out lever, manually operable means connected to one of said pair of levers and adapted upon operation to shift said assembly, and fluid pressure means connected to the other of said pair of levers and operable during movement of said pair of levers relative to said throw-out lever to shift said assembly.

8. In a motor vehicle, in combination with a clutch, operating mechanism therefor comprising a multi-part lever including a clutch throwout lever, a pressure regulation lever pivoted intermediate its ends to one end portion of the throw-out lever, a pressure application lever pivoted at one end to the opposite end of the clutch throw-out lever, means connecting the pressure regulation lever and pressure application lever, fluid pressure means connected with the pressure application lever and operative to shift the multi-part lever, manually operable means connected to the pressure regulation lever adapted when operated to shift said pressure regulation and pressure application levers, a valve for controlling said fluid pressure means, and valve operating means actuated by movement of said pivoted levers relative to said throw-out lever.

9. In a motor vehicle, in combination with a clutch, means for operating said clutch comprising a lever assembly including a clutch throw-out lever, a pressure regulation lever pivotally connected to one end portion of said throw-out lever, a pressure application lever pivotally connected to the other end portion of said clutch throw-out lever, means connecting adjacent end portions of the pressure regulation lever and pressure application lever, a clutch throw-out shaft to which said throw-out lever is fixedly secured whereby to support the entire assembly, manually operable means connected to the pressure regulation lever and operative to shift the latter and the entire assembly, fluid pressure means connected with the pressure application lever, valve means for controlling the fluid pressure means, and valve operating means connected to the valve and to the lever assembly adjacent the connection of the pressure regulation and pressure application levers.

WILLIS G. DOYLE.